(12) United States Patent
Croyle

(10) Patent No.: US 6,957,292 B2
(45) Date of Patent: Oct. 18, 2005

(54) UNIVERSAL SERIAL BUS CIRCUIT WHICH DETECTS CONNECTION STATUS TO A USB HOST

(75) Inventor: Richard Croyle, Mytchett (GB)

(73) Assignee: Nokia Corporation, Espoo (FI)

( * ) Notice: Subject to any disclaimer, the term of this patent is extended or adjusted under 35 U.S.C. 154(b) by 377 days.

(21) Appl. No.: 10/096,925

(22) Filed: Mar. 14, 2002

(65) Prior Publication Data

US 2002/0147876 A1 Oct. 10, 2002

(30) Foreign Application Priority Data

Apr. 6, 2001 (GB) .............................................. 0108754

(51) Int. Cl.$^7$ .............................................. G06F 13/40
(52) U.S. Cl. ...................................... 710/305; 710/313
(58) Field of Search ........................... 710/305, 19, 15, 710/72, 17, 63, 313, 100, 300; 712/32, 36; 340/286.01; 709/224; 361/683, 686; 713/300

(56) References Cited

U.S. PATENT DOCUMENTS

| | | | | |
|---|---|---|---|---|
| 6,131,134 | A | * 10/2000 | Huang et al. | ............... 710/302 |
| 6,370,603 | B1 | * 4/2002 | Silverman et al. | ............ 710/72 |
| 6,389,495 | B1 | * 5/2002 | Larky et al. | .................... 710/8 |
| 6,473,811 | B1 | * 10/2002 | Onsen | ......................... 710/15 |
| 6,581,122 | B1 | * 6/2003 | Sarat | .......................... 710/301 |
| 6,725,318 | B1 | * 4/2004 | Sherman et al. | ............ 710/313 |

FOREIGN PATENT DOCUMENTS

| | | |
|---|---|---|
| EP | 1043876 A2 | 10/2000 |
| JP | 11237936 A | 2/1998 |
| WO | 34878 A1 | 6/2000 |
| WO | 0034878 | 6/2000 |

OTHER PUBLICATIONS

"An embedded converter from RS232 to Universal Serial Bus" by de Almeida Pereira Zuquim, L..D.; coelho, C.J.N., Jr.; Fernandes, A>O>; de Oliveira, M.P.; Tavares, A.J. (abstract only) Pub. date: Sep. 10–15, 2001.*
"Analog circuit development system" by Jankovec, M. (abstract only) Pub. date: Sep. 22–24 (2003).*
International Search Report.

* cited by examiner

Primary Examiner—Gopal C. Ray
(74) Attorney, Agent, or Firm—Antonelli, Terry, Stout & Kraus, LLP

(57) ABSTRACT

The invention relates to universal serial bus circuits utilized in USB devices and USB hubs. Specifically, the invention relates to circuitry used to detect whether the hub or device is connected td a USB host, i.e. to detect connection status of the device or hub. The present invention provides a USB circuit comprising a microprocessor which receives signaling concerning the connection status of the USB circuit to a USB host circuit, first and second data signal lines which transmit respective first and second data signals to the microprocessor, a USB host power supply signal line which receives USB host power signaling to indicate connection status, and wherein the USB circuit analyzes the USB power supply signal line and change the data signal transmittal down the first and second data lines according to the connection statas of USB circuit to the USB host circuit.

29 Claims, 3 Drawing Sheets

UNIVERSAL SERIAL BUS CIRCUIT WHICH DETECTS CONNECTION STATUS TO A USB HOST

BACKGROUND OF THE INVENTION

1. Field of the Invention

The invention relates to Universal Serial Bus (USB) circuits utilized in USB devices and USB hubs. Specifically, the invention relates to circuitry used to detect whether the hub or device is connected to a USB host, i.e. to detect connection status of the device or hub.

2. Description of the Prior Art

A USB standard has been developed which allows up to 127 peripheral devices such as printers, scanners, keyboards, modems, telephones, cameras and storage devices to be attached to a host, usually a personal computer (PC), through a 4-wire bus. Such devices can be connected to the PC either directly, or via hubs. The hubs provide additional connections to the USB. USB has the advantage that connection of different types of devices becomes standardized. Furthermore, a device can be connected while the PC is switched on and while other devices are in use.

Taking the operation of a device as an example, the device is connected to a USB port provided by the PC or a hub. Once physically connected to the device, the PC controls attachment and configuration of the device. To achieve this, the PC is installed with a USB driver, which is usually provided by the PC's operating system. The PC is also installed with a device driver so that applications software on the PC can use the device once it has been attached and configured. The device driver is often provided by the operating system although for unusual devices, a user may need to install a specific device driver using installation disks.

Devices can be categorized in terms of the number of functions they perform. Most devices, such as a mouse, implement a single function. Some devices, such as a monitor having in-built speakers, implement multiple functions and have an embedded hub. Such a device is known as a compound device and appears to the PC as a hub with a collection of individual, non-removable functions. In the specific case of when a single function device, such as a mouse, is plugged into a PC for the first time, the USB driver detects, identifies and configures the device, and the operating system automatically assigns a device driver which, in the case of a mouse, is a mouse driver. Alternatively, and as mentioned above, a user may install and/or assign a specific device driver. When a compound device is plugged in for the first time the same process of detection, identification and configuration is carried out for each respective function so that all the functions of the compound device are available to the PC. To make this process work efficiently, a USB device needs to be able to detect that it has been connected to a USB host so that the USB device may begin to respond to the communication from the host. Similarly, the USB device needs to know when the USB device has been disconnected from the USB host, and is able to differentiate between disconnection and a silent period during communication.

Although a USB circuit herein includes circuits incorporated into hubs per se, embedded hubs, and devices with single or multiple functions, for the sake of simplicity, the discussions below focus on the application and advantages of the invention with particular reference to USB device circuits.

Simple devices, such as a mouse, do not have a power supply but operate by using power from the host sent down a 5V 'Vbus' line. The devices are only operational when they have power from the host and thus it is a relatively simple manner to configure the devices so that the devices recognize that connection to a host. Such devices are known as 'bus powered' devices. However, many devices require more power than can be supplied by the Vbus line, and may also operate independently of the host e.g. mobile telephones and MP3 players. Therefore, these devices require 'self powering'—i.e. they have their own power supply. As these devices are operational without having to be connected to a host, these devices require relatively complicated circuitry to identify whether or not connection to a host exists. However, in the case of both bus-powered and self-powered devices, the Vbus power supply line is central to determining connection status (usb2.0 specification, http://www.usb.org) as the use of the Vbus power supply line is not only reliable in indicating connection status, but also assists in resisting lock up conditions.

The invention is only applicable to self-powered devices (or hubs), and thus only the existing operation of such devices is considered. In practice, a microprocessor in the self-powered device circuitry is configured to analyze the signal from the Vbus line and determine whether a connection has been made based on the presence or absence of a signal. A drawback of this method is the use of a separate Input/Output (I/O) pin of a severely pin limited microprocessor to solely determine the connection status. Furthermore, additional circuit components are required to adapt the Vbus signal into a form suitable for the microprocessor. This is because the USB device microprocessor, in today's low voltage technology, is only capable of utilizing signalling of a much lower voltage than 5V. Also, the microprocessor may be sensitive to fluctuations in voltage (noise) which are known to occur in the Vbus line. This necessitates the requirement for the Vbus signal to be initially passed through a separate voltage comparator circuit which both reduces the strength of the signal and regulates the signal supplied to the microprocessor within the required stringent tolerance. However, the comparator is a relatively expensive component, which is also relatively large and thus occupies valuable space on a circuit board. Tracking complexity is also increased.

The USB standard defines that differential signalling be used to remove noise added to the data. Differential signalling is known in the art and is used to compare a first data signal with a corresponding inverse second data signal, each of these signals being sent down separate data lines. As it is known that the second signal should generally be a mirror image of the first signal, it is possible to identify and correct inconsistencies between the data signals. Thus, at least two separate data signalling lines are currently available in USB devices.

SUMMARY OF THE INVENTION

The present invention provides a USB circuit comprising:
  a microprocessor which receives signalling concerning the connection status of the USB circuit to a USB host circuit;
  first and second data signal lines which transmit respective first and second data signals to the microprocessor;
  a USB host power supply signal line which receives USB host power signalling to indicate connection status; and
  wherein the USB circuit comprises connection status signalling means which to analyze the USB power supply signal line and change the data signal transmitted down the first and second data lines according to the connection status of the USB circuit to the USB host circuit.

The existing first and second data lines used in USB circuit are now also used to provide the microprocessor with information as to whether the circuit is connected to a host, and thus the invention obviates the need for separate circuit components (e.g. comparator) to regulate the Vbus signal to the microprocessor. Unlike the Vbus line, comparatively low voltages and currents are sent down the data lines, and thus less current is wasted in sending the connection status information through existing data lines to the microprocessor than through the Vbus regulator circuitry. In addition, the absence of Vbus regulator components results in a circuit that is more suitable to miniaturization. The use of existing I/O) connections to the microprocessor also frees up a (I/O) microprocessor pin. Furthermore, the invention reduces the tracking complexity in often densely packed circuitry.

Data packets comprise a series of '1's and '0's and, as mentioned previously, the USB specification requires that data sent down a first line is largely a mirror image of date sent down a second line. For example, if the data packet sent down the first line is '1000', the data packet sent down the second line will be '0111'. Thereby, data is represented by simultaneous transmission of '1's and '0's down the respective data lines and accordingly a '1' signal down the first data line and a simultaneous transmission of a '0' signal down the second data line is known to represent data. Correspondingly, the reverse condition of a '0' signal in the first data line and a 'corresponding 1' signal in the second data line is also known to represent data.

Furthermore, USB convention dictates that the end of a data packet is represented by simultaneous transmission of a '0' signal down each of the data lines. However, the simultaneous '1' condition is currently not used in the USB standard.

Advantageously, the connection status signalling means of the USB circuit is preferably configured to simultaneously send a '1' signal down each of the data lines to the microprocessor when the USB circuitry is in a disconnected state, and the microprocessor identifies the simultaneous '1' condition with a disconnected state. Accordingly, the invention utilizes the unused simultaneous '1' condition to beneficial affect.

This may be done by means of hardware and/or software. For example, in the case of hardware, a NOT gate may be used to invert the signal from the power supply signal line such that the '1' signal is only transmitted in the disconnected state. This inverted signal would then be sent to one input of each of two OR gates. The remaining input of the two OR gates would each be connected to the host end of one of the data signal lines, and the output of each of the two OR gates would be connected to the microprocessor end of the corresponding data line. This configuration identifies the disconnected state by analyzing signalling in the data signal lines or the power supply signal line. Obvious alternative solutions, which just examine the power supply signal line, are also within the scope of the invention. A signal filter may also be provided to reduce signal inconsistencies between signalling from the data lines. One or more of these logic gates may be replaced by software.

A NAND logic gate output signal is '0' when all the input signals are '1', otherwise the output is '1'. Conveniently, the USB circuit may be adapted to have a NAND logic gate connected to the data lines to convert the simultaneous '1' signalling state in each of the data lines to a single '0' signal state. In this case, the microprocessor is adapted to identify the '0' state condition with a disconnected state. A signal filter may also be connected to the NAND logic gate input to reduce signal inconsistencies. The NAND logic gate/signal filter may be incorporated into the microprocessor or be independent thereof. Alternatively, one or more of these components may be replaced by software.

USB circuits generally comprise a transceiver to transmit and receive signalling. Preferably, the connection status signalling means is incorporated into the transceiver. In particular, the incorporation of logic gates into the transceiver would reduce tracking complexity and the physical size of the hardware solution.

USB circuits generally comprise a USB Digital Applications Specific Integrated Circuit (ASIC) to analyze and control operations of the USB circuit. Preferably, the aforementioned microprocessor is contained in a USB Digital ASIC. However, the microprocessor may be separate to the USB Digital ASIC. The microprocessor may also be incorporated into the transceiver.

ASICs may have spare non-utilized circuit components such as logic gates, amplifiers and/or resistors. Preferably, the connection status signalling means is configured to utilize these spare circuit components, thereby making use of spare components which are much smaller than any external hardware. In addition, although the ASIC tracking is relatively complex, such tracking occupies a much smaller area than would be required by external PCB tracking. Although the ASIC may not have spare circuit components, it would still be advantageous to incorporate these relatively small circuit components into the ASIC and still provide a circuit which is smaller than existing USB circuits.

Preferably, the USB circuit is incorporated into a USB device, such as a mobile telephone or communicator. The USB circuit may also be incorporated into a USB hub.

BRIEF DESCRIPTION OF THE DRAWINGS

Specific embodiments of the invention will now be described below with reference to the following figures in which.

DESCRIPTION OF THE PREFERRED EMBODIMENTS

Figure 1:
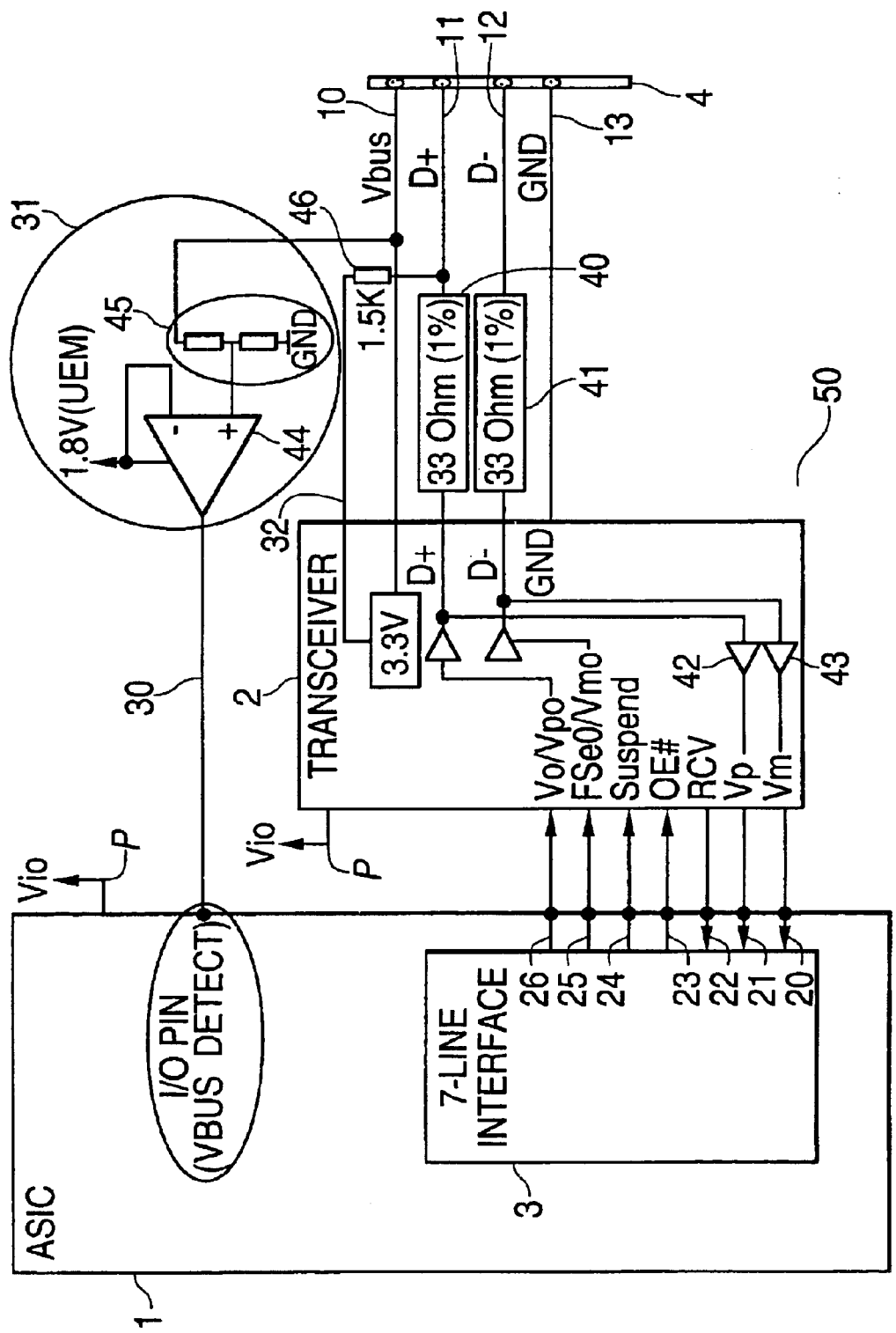
FIG. 1 is a schematic representation of circuitry according to prior art.

The prior art circuit 50 shown in FIG. 1 can be commonly found in USB devices, such as a digital camera. It comprises a USB Digital ASIC 1 (which contains a microprocessor), a transceiver 2, and a USB core 3. The ASIC 1 controls and regulates the operation of the circuit 50. The transceiver 2 transmits signalling between a connected USB host (not shown) and the ASIC 1. The USB core 3 is used to configure the circuitry 50 to the USB standard, and is shown combined with the ASIC 1. Both the ASIC 1 and the transceiver 2 source power along track P.

The transceiver 2 receives signalling from the host along a number of tracks 10, 11, and 12. Specifically, track 10 transmits power signalling (Vbus) to the transceiver 2, and tracks 11 and 12 transmit data signalling (D+, 0−) between the host and transceiver 2. In contrast to track 10, tracks 11 and 12 are used for two-way transmission between the transceiver 2 and the host. Tracks 11 and 12 are interrupted by resistors 40 and 41 respectively to adapt the signals (D+, D−) into a suitable form for transmission between the host and transceiver 2. A further track 13 is provided to ground the transceiver 2. In order to allow convenient connection to the host, the host end of each of these tracks 10, 11, 12, and 13 terminates at a connection port 4.

Communication between the transceiver 2 and the ASIC 1 is along tracks 20, 21, 22, 23, 24, 25 and 26. Each of these tracks are attached to the ASIC 1 using separate I/O ASIC pins. However, whereas tracks 20, 21 and 22 are used to transmit signalling from the transceiver 2 to the ASIC 1, tracks 23, 24, 25 and 26 are used to transmit signalling from the ASIC 1 to the transceiver 2.

With regard to data transmission down tracks 20 and 21, the transceiver 2 is arranged to take data signalling (D+, D−) from tracks 11 and 12 and feed the data signalling to tracks 20 and 21 respectively. The transceiver 2 is also arranged to modify the data signals into a form (Vp, Vm) suitable for the ASIC 1.

This is done by passing the signals (0+, 0−) through single end receivers 42 and 43 respectively.

In the case of data transmission down track 22, a differential signal (RCV) is sent to the ASIC 1 along this track 22, and is used by the ASIC 1 to remove noise which may have been added to the data signals (D+, D−). The differential signal is generated in the transceiver 2 by comparing the 0+ and 0− data signals which should be the inverse of one another.

Turning to signalling from the ASIC 1 to the transceiver 2, track 23 is used to switch the transceiver 2 between transmitting and receiving modes. Track 24 is used to place the transceiver 2 into a low power mode upon host command, and track 25 is used to tell the transceiver 2 to transmit the USB signalling state called Single ended zero (SeO), where both 0+ and D− are set to '0' at the same time. Track 26 is a, data transmission line and is used to send data Vo from the ASIC 1 to the transceiver 2. The transceiver 2 is further configured to take this data Vo and pass it back along tracks 11 and 12 to the host. An alternative transmission technique allows the transceiver 2 to transmit 0+ data according to the stimulus on a Vpo transceiver pin, and 0− data according to the stimulus on a Vmo transceiver pin.

The circuit 50 comprises a further track 32 which is used to notify the host that the device circuitry 50 has been connected to the host. The track 32 is interrupted by a resistor 46 and effectively connects the transceiver end of track 10 back to the host via track 11. In operation, connection of the host to the device circuitry 50 using connection port 4 sends a Vbus signal down track 10 to the transceiver 2. The Vbus signal is then transmitted along track 32, through resistor 46, and back to track 11. This signal travels down track 11, through connection port 4 and back to the host, whereupon it is detected by the host.

The circuit 50 also has an additional track 30 which connects track 10 to the ASIC 1 using a separate I/O ASIC pin, and without first passing through the transceiver 2. The track 30 is interrupted by circuitry 31 to control the Vbus signal from track 10 within a range which is suitable for the ASIC 1. This is done by using a comparator (operational amplifier) 44 and a potential divider 45. This circuitry 31 is used to provide the ASIC 1 with the connection status of device. Simply, if the ASIC 1 receives a signal then the ASIC 1 recognizes connection to the host. Otherwise, the ASIC 1 recognizes disconnection.

Figure 2:
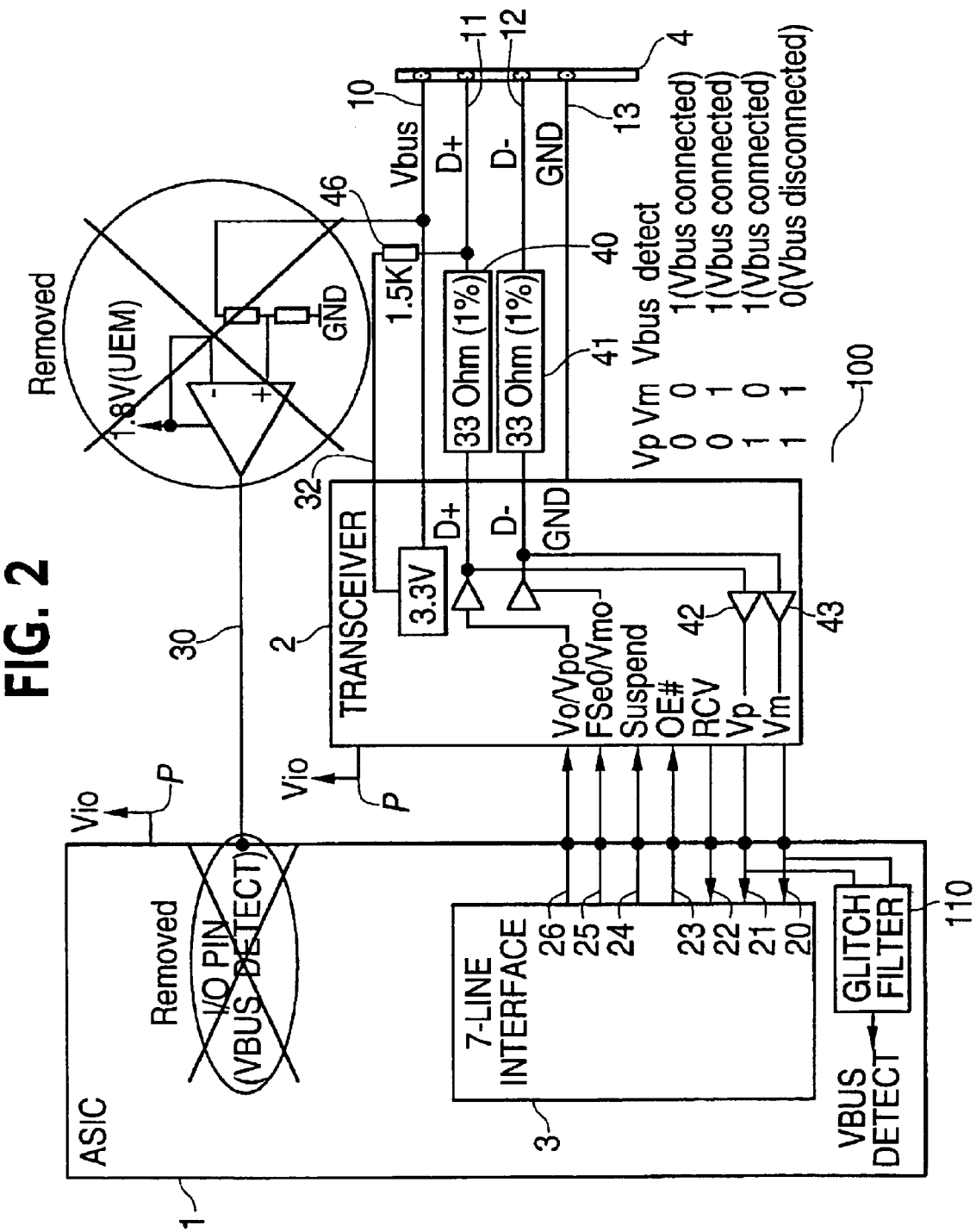
FIG. 2 is a schematic representation of circuitry according to the present invention.
Figure 3:
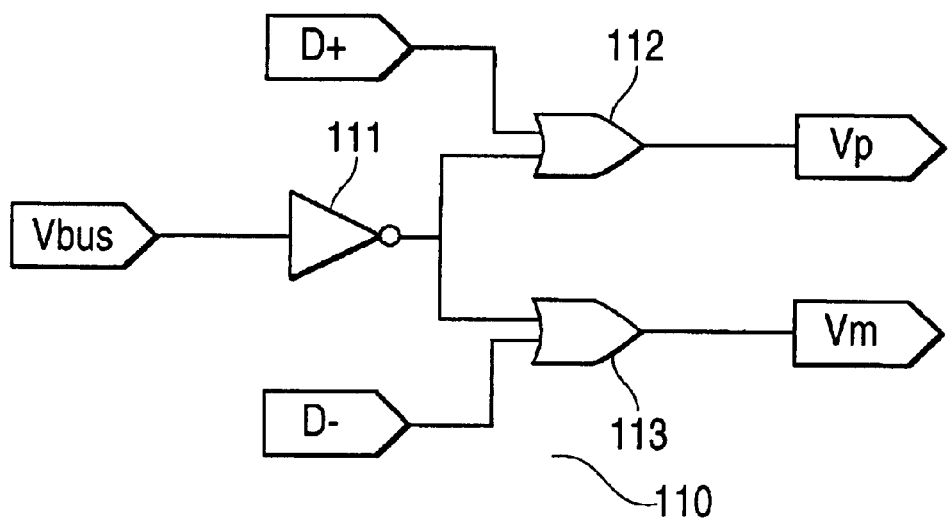
FIG. 3 is a schematic representation of circuitry used to drive the signalling change according to the present invention.

FIG. 2 illustrates a circuit 100 according to the present invention. Common components have corresponding reference numerals to circuit 50, and perform the same functions as described previously. In contrast to circuit 50 however, circuit 100 does not have track 30 or circuitry 31 (components 44, 45). Instead, the transceiver 2 is configured to analyze the signal down track 10. If the transceiver 2 detects the vbus signal, the transceiver allows the ASIC 1 to determine that the circuit 100 is connected to a host by the receipt of data packets from tracks 20 and 21. However, if the circuit 100 is disconnected from the host, there will be no Vbus signal in track 10. In such a case, the transceiver 2 is configured to change the vp, Vm signals in track 20 and 21 to the simultaneous '1' state i.e. on receipt of a '0' signal from the Vbus line 10, the transceiver 2 inverts the signal into a '1' signal and sends this signal for transmission through tracks 20 and 21. This inversion of signalling is done by using a NOT gate 111 (FIG. 3). In such an arrangement, the ASIC 1 is configured to recognize this simultaneous '1' state with a disconnected state.

Some additional circuitry may be required to prevent the simultaneous '1' signalling being sent back along tracks 20 and 21 to, tracks 11 and 12 respectively. One solution is to incorporate the circuitry 110 shown in FIG. 3 into the transceiver 2. In this arrangement, the inverted signal from the NOT gate 111 is sent to one input of each of the two OR gates 112, 113. The remaining input of the two OR gates 112, 113 are each connected to receive signalling D+, 0− from tracks 11 and 12, and the output of each of the OR gates 112, 113 are connected to send signalling Vp, Vm to corresponding tracks 20 and 21. This configuration not only prevents signalling being sent back along tracks 11 and 12, but it also identifies the disconnected state by analyzing 0+, D− signals together with the Vbus signal.

The circuit 100 is configured to positively change the Vp, Vm signal state when power is not being received from the host through track 10. As power is required to positively change the Vp, Vm signals to the simultaneous '1' state, the invention is only applicable to self-powered circuitry i.e. those circuits which do not rely on power from the host.

A convenient embodiment of the invention provides the ASIC 1 with a NAND gate 125 to convert the simultaneous '1' state Vp,Vm signals into a single unique '0' state (Vbus detect). The truth table of FIG. 2 illustrates the logic. Of course, the ASIC 1 would be configured to identify the '0' state with a disconnected state. In an alternative embodiment, the NAND gate 125 could be replaced by an AND gate (not shown) and the ASIC 1 configured to identify the '1' state with a disconnected state.

Figure 4:
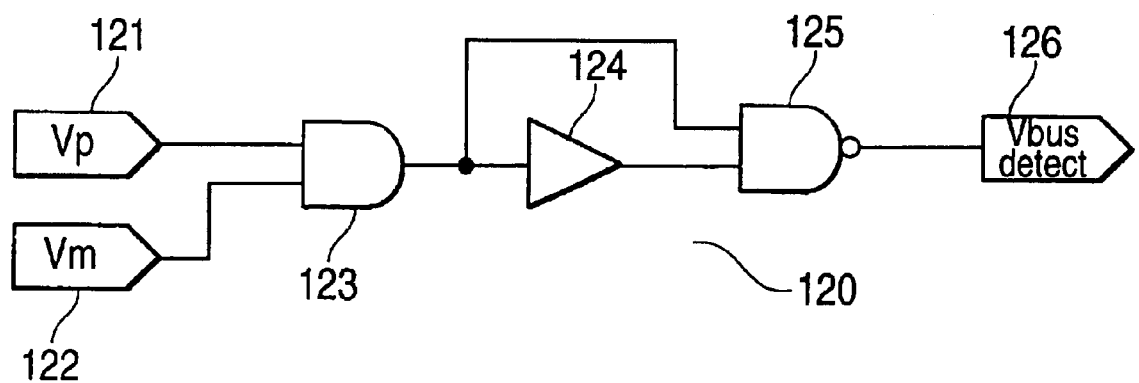
FIG. 4 is a schematic representation of filter circuitry used in the present invention.

During changing of signal states, the 0+and D− signals can both be at the logic '1' state for up to 14 ns and thus the vp, Vm signals require filtering. A suitable filter circuit 120 incorporating the NAND gate 125 is shown in FIG. 4 and comprises two inputs 121, 122, an AND gate 123, a delay buffer 124 and a output 126. The circuit prevents the "14 ns(max) glitch" being sent to the ASIC 1.

It will be appreciated that the size and cost of the NAND gate 125 and/or the filter circuit 120 added to the digital ASIC 1 is/are much smaller than the size and cost of the external Vbus comparator detection hardware 30, 31. This is also true of the logic circuitry 110 incorporated in the transceiver 2. It will also be appreciated that the embodiment shown in FIG. 2 eliminates both the use of a separate I/O ASIC pin and also a separate external track and comparator circuitry. The tracking complexity of the circuit is thus reduced, which is a particular advantage in densely packed Printed Circuit Boards (PCBS) or Printed Wiring Boards (PWB).

What is claimed is:

1. A USB circuit comprising:

a microprocessor which receives signaling concerning a connection status of the USB circuit to a USB host circuit;

first and second data signal lines which transmit respective first and second data signals to the microprocessor;

a USB host power supply signal line which receives USB host power signaling to indicate the connection status; and wherein the USB circuit comprises connection status signaling means which analyze the USB power supply signal line and change the data signal transmitted down the first and second data lines according to the connection status of the USB circuit to the USB host circuit and simultaneously sends a "1" signal down each of the data lines to the microprocessor when the USB circuit is in a disconnected state.

2. The USB circuit according to claim 1, wherein the connection status signaling means comprises a NOT gate and two OR gates, the NOT gate providing an input into each of the two OR gates, remaining OR gate inputs each being connected to the host end of one of the data signal lines, and wherein the output of the two OR gates is connected to a microprocessor end of the corresponding data line.

3. The USB circuit according to claim 2, wherein the circuit includes a NAND gate connected to the data lines to convert the simultaneous "1" signaling state to a single "0" signal state.

4. The USB circuit according to claim 2, comprising a signal filter which reduces signal inconsistencies between signaling from the data signal lines.

5. The USB circuit according to claim 1, wherein the circuit includes a NAND gate connected to the data lines to convert the simultaneous "1" signaling state to a single "0" signal state.

6. The USB circuit according to claim 5, comprising a signal filter connected to the NAND gate input to reduce signal inconsistencies.

7. The USB circuit according to claim 6, wherein the NAND gate incorporated into the microprocessor.

8. The USB circuit according to claim 5, wherein the NAND gate is incorporated into the microprocessor.

9. The USB circuit according to claim 5, comprising a signal filter which reduces signal inconsistencies between signaling from the data signal lines.

10. The USB circuit according to claim 1, comprising a signal filter which reduces signal inconsistencies between signaling from the data signal lines.

11. The USB circuit according to claim 1, comprising a signal filter which reduces signal inconsistencies between signalling from the data signal lines.

12. The USB circuit according to claim 11, comprising a signal filter connected to the NAND gate input to reduce signal inconsistencies.

13. The USB circuit according to claim 11, wherein the NAND gate incorporated into the microprocessor.

14. The USB circuit according to claim 1, wherein the microprocessor and/or connection status signaling means is contained in a USB Digital ASIC.

15. The USB circuit according to claim 14, wherein the USB circuit comprises a transceiver and the microprocessor is incorporated into the transceiver.

16. The USB circuit according to claim 1, wherein the USB circuit comprises a transceiver and the connection status signaling means is incorporated into the transceiver.

17. The USB circuit according to claim 1, wherein the USB circuit is incorporated into a USB device.

18. The USB circuit according to claim 1, wherein the USB circuit is incorporated into a USB hub.

19. The USB circuit according to claim 1 comprising:
a USB device.

20. The USB circuit according to claim 1 comprising:
a USB hub.

21. The USB circuit according to claim 1 comprising:
a printer.

22. The USB circuit according to claim 1 comprising:
a keyboard.

23. The USB circuit according to claim 1 comprising:
a scanner.

24. The USB circuit according to claim 1 comprising:
a modem.

25. The USB circuit according to claim 1 comprising:
a camera.

26. The USB circuit according to claim 1 comprising:
a mobile telephone.

27. The USB circuit according to claim 1 comprising:
a MP3 player.

28. The USB circuit according to claim 1 comprising:
a device performing multiple functions.

29. The USB circuit according to claim 1 comprising:
a monitor.

* * * * *